United States Patent [19]

VanEss

[11] Patent Number: 5,007,069
[45] Date of Patent: Apr. 9, 1991

[54] DECODING OF SIGNALS USING COPHASE AND DIFFERENTIATING SIGNAL DETECTION

[75] Inventor: David W. VanEss, Arlington, Wash.

[73] Assignee: Talkie Tooter Inc., Sedro Woolley, Wash.

[21] Appl. No.: 120,594

[22] Filed: Nov. 13, 1987

[51] Int. Cl.$^5$ .................... H04L 27/14; H04L 27/16
[52] U.S. Cl. ...................... 375/80; 329/315; 340/825.76
[58] Field of Search ........ 375/97, 10, 80, 82; 324/79 R, 82, 77 B, 77 G, 77 R, 78 D, 79 D; 340/870.26, 825.72, 825.75; 379/283; 328/134; 329/315; 370/110.3

[56] References Cited

U.S. PATENT DOCUMENTS

| | | | |
|---|---|---|---|
| Re. 27,044 | 9/1964 | Rothenbuhler et al. | 340/825.72 |
| 2,724,049 | 11/1955 | Rovault | 455/36 |
| 2,899,639 | 8/1959 | Shepherd | 324/79 R |
| 2,921,292 | 1/1960 | Undy | 340/171 |
| 2,933,682 | 4/1960 | Moulton et al. | 324/79 |
| 2,988,695 | 6/1961 | Leavitt | 324/82 |
| 3,217,255 | 11/1965 | Broadhead, Jr. et al. | 455/46 |
| 3,271,680 | 9/1966 | Reynold | 324/88 |
| 3,395,346 | 7/1968 | Kincheloe et al. | 324/88 |
| 3,593,256 | 10/1969 | Gannon | 375/97 |
| 3,652,933 | 3/1972 | Rubner et al. | 324/82 |
| 3,660,763 | 5/1972 | Parzen | 324/79 R |
| 3,701,012 | 11/1972 | Lang | 324/79 R |
| 3,806,664 | 4/1974 | Bowen et al. | 340/171 R |
| 3,812,433 | 5/1974 | Bradley | 328/144 |
| 3,953,802 | 4/1976 | Morris et al. | 375/104 |
| 3,984,770 | 10/1976 | Chu | 324/82 |
| 4,021,653 | 5/1977 | Sharp et al. | 324/78 D |
| 4,197,525 | 4/1980 | Biery, Jr. et al. | 324/78 D |
| 4,291,269 | 9/1981 | Nossen | 324/79 D |
| 4,361,804 | 11/1982 | Arnold | 324/79 R |
| 4,467,277 | 8/1984 | Jones | 324/78 R |
| 4,523,324 | 6/1985 | Marshall | 375/97 |
| 4,561,115 | 12/1985 | Pfeifer | 340/825.48 |
| 4,633,517 | 12/1986 | Pfeifer | 340/825.48 |
| 4,726,069 | 2/1988 | Stevenson | 375/97 |
| 4,728,884 | 3/1988 | Gumm | 324/79 R |

Primary Examiner—Benedict V. Safourek
Assistant Examiner—Stephen Chin
Attorney, Agent, or Firm—Christensen, O'Connor, Johnson & Kindness

[57] ABSTRACT

The disclosed decoder (14) produces an output signal when a receiver (12) signal contains frequencies that are sequentially within a predetermined passband surrounding detection frequencies $f_1$ and $f_2$. The receiver signal is mixed at exclusive-OR logic gates (52, 54) with cophase reference signals R1 and R2, which are produced by a reference tone generator (18) and have a frequency $f_r$ that corresponds to the desired tone detection frequency $f_1$ and $f_2$ and a phase difference of 90°. The outputs of gates (52, 54) are applied to low pass filters (56, 58), which produce outputs having a frequency $\Delta f$ equal to the absolute value of the difference between the input and reference frequencies $f_i$ and $f_r$, provided that $\Delta f$ is below the filter's cutoff frequency $f_{c1}$. A cophase detection circuit (60, 62, 64, and 66) produces a high logic output when signals are passed by filters (56, 58), indicating that the frequency of the receiver signal differs from the desired tone detection frequency by less than $f_{c1}$. To further enhance the accuracy of tone detection, a differentiating tone detection arrangement (68 through 84) is provided to determine whether $\Delta f$ is less than some second cutoff frequency $f_{c2}$ or greater than $f_{c1}$. Two differentiating circuits (68, 70) receive the outputs of filters (56, 58) and produce bidirectional square waves having magnitudes corresponding to $\Delta f$. These square waves are then compared with some predetermined threshold to produce an output only when $\Delta f$ is below $f_{c2}$ or above $f_{c1}$. The cophase and differentiating tone detection outputs are combined to produce an output when a tone corresponding to the detection frequency $f_1$ or $f_2$ has been detected.

22 Claims, 7 Drawing Sheets

DECODING OF SIGNALS USING COPHASE AND DIFFERENTIATING SIGNAL DETECTION

FIELD OF THE INVENTION

This invention relates generally to the field of communication systems and, more particularly, to apparatus for decoding signals that are encoded by means of one or more tones of specified frequency.

BACKGROUND OF THE INVENTION

The use of remote control to effect a desired operation of various systems and devices is relatively widespread. For example, inaccessible or inconveniently located systems are particularly suited for remote control. Similarly, when a number of widely dispersed systems are involved, remote control can be used to provide the desired operation of each system from a single control point. In either case, control is easily achieved with a minimum of operator time, thus reducing system operating costs.

One way in which reliable remote control has been achieved is with the aid of communication systems. Such communication systems produce a suitably encoded signal, usually by modulating one or more tones of specified frequency and duration onto an appropriate radio frequency (RF) carrier wave, and transmit the signal to the system to be controlled. There, the encoded signal is received and demodulated, with the resultant tones being applied to a decoding apparatus. The decoding apparatus produces an output signal that effects a change in the operation of the remote system only upon receipt of tones having the specified frequency and duration. Otherwise, the operational status of the system remains unchanged.

One particular type of communication system that has found widespread commercial acceptance in the logging industry employs an encoded signal commonly identified as a "two-tone sequential" signal. The encoded signal is used to effect the remote actuation of a whistle or other signaling device to indicate to personnel information concerning the operation of logging equipment. While two such "two-tone sequential" systems are described in detail in U.S. Pat. Nos. Re. 27,044 "Two-Tone Remote Control System," Rothenbuhler et al., issued Feb. 2, 1971, to the assignee of the present invention, and 4,197,525, "Tone Decoder," Biery, Jr. et al., issued Apr. 8, 1980, to the assignee of the present invention, their operation is briefly as follows.

A first tone of limited duration and of a specified frequency is modulated upon an RF carrier by a transmitter. Immediately following the termination of the first tone, a second tone having a specified frequency that is different from the frequency of the first tone is modulated upon the RF carrier. The duration of the second tone is equal to the desired actuation time of the remote signaling device and the frequency of both tones is typically in the audible frequency range.

At the location of the whistle, signals having the frequency of the RF carrier are received and demodulated. The demodulated signals are then supplied to a decoder. The function of the decoder is to first identify the occurrence of a demodulated signal having a frequency corresponding to the nominal frequency of the first tone. In that event, the decoder continues to monitor the demodulated signal for the occurrence of a signal having a frequency corresponding to the nominal frequency of the second tone. The decoder provides an output signal to the whistle when the frequency of the demodulated signal corresponds to that of the second tone, but only if such a demodulated signal is detected within a predetermined period of time following detection of the first tone. Such a "two-tone sequential" system provides reliable, remote actuation of the whistle, even in the presence of encoded signals used in other communication systems and having the same RF carrier modulated with a single tone at the nominal frequency of either the first or the second tone.

As will be appreciated from the preceding discussion, it is desirable to provide a tone decoder that is able to detect tones with a high level of precision. More particularly, while the use of "two-tone sequential" encoding is designed to minimize the unintended actuation of a remote system or device, the effectiveness of this technique is proportional to the ability of the decoder to precisely identify the two tones in sequence. Further, it is typically desirable that the decoder respond quickly to encoded information to avoid undue delay in the control of the remote system. Thus, it would be desirable to provide a decoder that is able to both quickly and accurately identify one or more tones encoded upon a carrier wave.

SUMMARY OF THE INVENTION

In accordance with this invention, a method is disclosed for detecting whether the frequency $f_i$ of an input signal is within some frequency range defined with respect to the frequency $f_r$ of a reference signal. Pursuant to the method, a frequency difference $\Delta f$ equal to the absolute value of the difference between frequencies $f_i$ and $f_r$ is monitored. A determination is then made whether the frequency difference $\Delta f$ is less than some first value $f_{c1}$ and whether it is less than some second value $f_{c2}$. A detection output is provided when the frequency difference $\Delta f$ is less than $f_{c1}$ and less than $f_{c2}$.

In accordance with a particular aspect of this invention, the method includes the production of a first signal $f(\phi)$ whose magnitude is a function of its phase angle $\phi$, and whose frequency is equal to $\Delta f$, where $\Delta f$ is the absolute value of the difference between frequencies $f_i$ and $f_r$. A second signal $f(\beta)$ is then produced whose magnitude is a function of its phase angle $\beta$, and whose frequency is equal to $\Delta f$. The signal $f(\beta)$ is offset from $f(\phi)$ by 90° and the sum S of the absolute value of $f(\phi)$ and the absolute value of $f(\beta)$ is equal to 1 when $\Delta f$ is less than some defined level $f_{c1}$. The method also includes the step of monitoring the sum S and providing a cophase detection output when S is equal to 1.

In accordance with a further aspect of this invention, the method includes the step of producing a first signal whose slope is proportional to $\Delta f$, where $\Delta f$ is the absolute value of the difference between frequencies $f_i$ and $f_r$. The first signal is then differentiated to provide a slope detection signal with an amplitude that is proportional to the frequency difference $\Delta f$. Finally, a differentiating detection output is provided when the slope detection signal's amplitude is less than some defined level.

In accordance with yet another aspect of this invention, the method includes the steps of producing a first output when $\Delta f$ is less than some first value $f_{c1}$ and producing a second output when $\Delta f$ is less than some second value $f_{c2}$ or greater than $f_{c1}$. A detection output is produced when both first and second outputs are produced, indicating that $\Delta f$ is less than $f_{c2}$.

BRIEF DESCRIPTION OF THE DRAWINGS

The invention will presently be described in greater detail, by way of example, with reference to the accompanying drawings, wherein.

DETAILED DESCRIPTION OF THE PREFERRED EMBODIMENT

Figure 1:
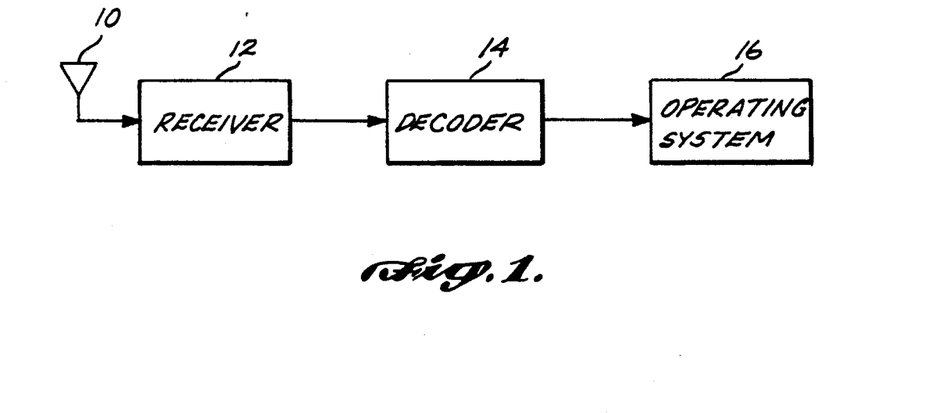
FIG. 1 is a block diagram of the remote portion of a communication system for effecting actuation of a utilization device or operating system, as known to the prior art.

Referring now to FIG. 1, an encoded signal, comprising one or more tone signals of predetermined frequency and duration modulated upon an appropriate RF carrier wave, is picked up by an antenna 10 and applied to a receiver 12. After detection and demodulation in receiver 12, the tone signals are supplied to a decoder 14. The decoder 14 provides an output signal to actuate an operating system 16 if, and only if, the tone signals supplied to decoder 14 have the proper coding.

The present invention is particularly concerned with an improved form of decoder 14 and the preferred embodiment of the invention, to be described hereinafter, is particularly adapted to decode a "two-tone sequential" encoded signal of the type commonly used in the logging industry. It is to be understood, however, that the decoder of the present invention is not limited thereto and is adapted to decode encoded signals in which the coding is represented by a single tone signal of a predetermined frequency, or multiple tone signals, each of a predetermined frequency and of a predetermined timing relationship to each other, as will be apparent from the ensuing discussion.

Figure 2:
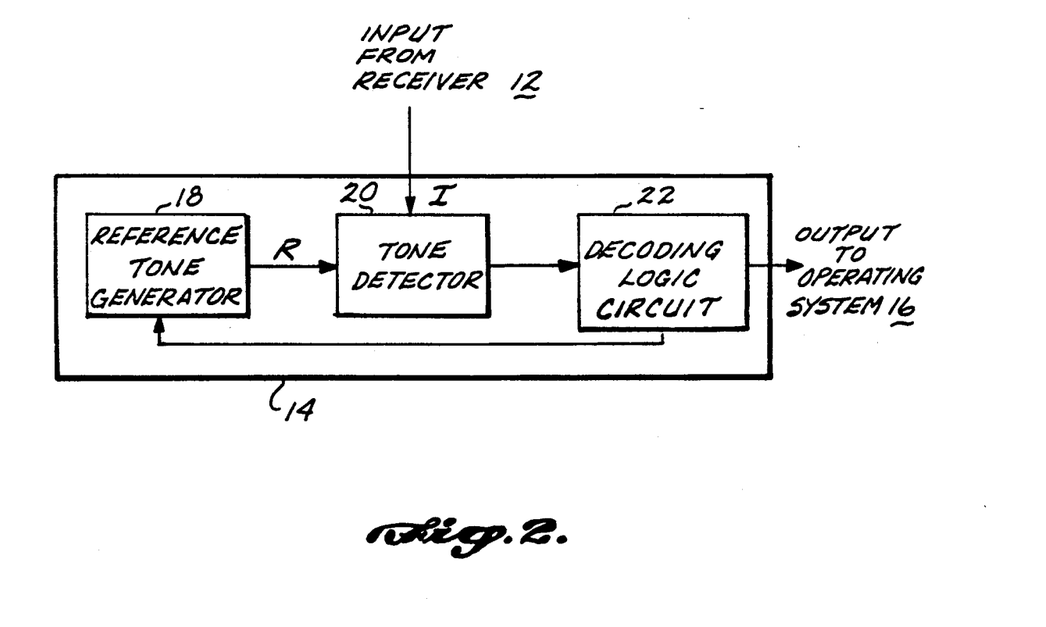
FIG. 2 is a block diagram of a decoder useful in such a communication system and constructed in accordance with the present invention.

As shown in FIG. 2, the decoder 14 includes a reference tone generator 18, tone detector 20, and decoding logic circuit 22. As discussed in greater detail below, reference tone generator 18 produces a reference signal R having a frequency $f_r$ that is adjusted to correspond to the target frequency $f_i$ of a first tone signal to be detected. This reference signal R, along with a demodulated receiver signal I having a frequency $f_i$, is applied to tone detector 20. The tone detector 20 employs what will be referred to as cophase and differentiating tone detection to determine whether the frequency $f_i$ of the receiver signal I sufficiently corresponds to the desired reference frequency $f_r$ and hence target frequency $f_1$. As discussed in greater detail below, the combination of cophase and differentiating tone detection performed by tone detector 20 enhances both its speed and accuracy. The output of detector 20 is applied to the decoding logic circuit 22, where signals to the operating system 16 and reference tone generator 18 are provided based upon the relationship between $f_i$ and $f_r$.

Figure 3:
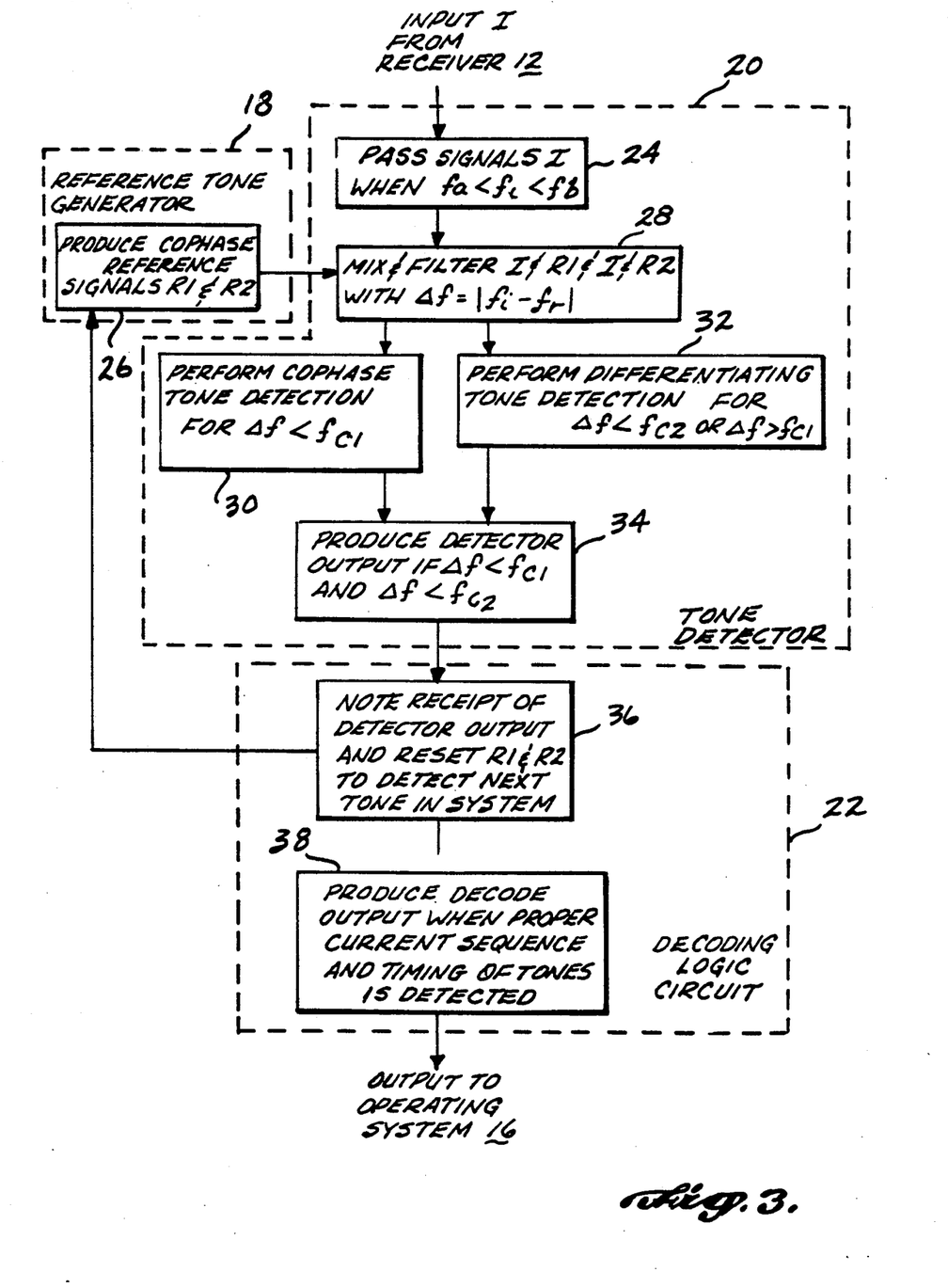
FIG. 3 is a flow chart illustrating the basic operation of the decoder of FIG. 2, with cophase signal detection and differentiating signal detection functions shown separately.

Describing the operation of decoder 14 in slightly greater detail, reference is had to the block diagram of FIG. 3. There, the various functions performed by the decoder 14 are shown grouped within broken-line representations of the reference tone generator 18, tone detector 20, and decoding logic circuit 22. Addressing first the inputs to tone detector 20, the input I from receiver 12 is rejected at block 24 unless its frequency $f_i$ is within some expected range of all frequencies to be sequentially detected by the decoder 14. As indicated, this range is conveniently defined by lower and upper frequency limits $f_a$ and $f_b$, respectively. A cophase reference signal R, having a frequency $f_r$ corresponding to that of the tone to be presently detected, is produced at block 26 and includes two versions R1 and R2 that vary in phase by 90°. Both versions R1 and R2 of the cophase reference signal are mixed with the input signal I at block 28, with the resultant signals containing information regarding a frequency difference $\Delta f$ that is equal to the absolute value of $f_i$ minus $f_r$.

The output of block 28 is applied separately to blocks 30 and 32, where the cophase tone detection and differentiating tone detection functions are performed. Briefly, at block 30, a test is made to determine whether $\Delta f$ is less than some predetermined first cutoff frequency $f_{c1}$. If so, an output is produced upon satisfaction of the trigonometric identity:

$$|f(\phi)| + |f(\phi+90)| = 1 \tag{1}$$

where: $f(\phi)$ is the multiplexed and filtered form of I and R1 and $f(\phi+90)$ is the multiplexed and filtered form of I and R2. As will be appreciated, $f(\phi)$ and $f(\phi+90)$ exhibit the cophase relationship introduced at block 26. It should be noted that the identity expressed in equation (1) is only true for particular functions and for linear phase differences between $f(\phi)$ and $f(\phi+90)$.

The differentiating tone detection performed at block 32 processes the multiplexed information from block 28 to produce a derivative-based confirmation of $\Delta f$. Block 32 then produces an output in the event that the second measurement of $\Delta f$ is less than some predetermined second cutoff frequency $f_{c2}$ or greater than $f_{c1}$.

The outputs of blocks 30 and 32 are combined at block 34 to produce a single tone detector output in the event that the difference $\Delta f$ between the frequency $f_i$ of the input signal I and the frequency $f_r$ of the reference signals R1 and R2 is less than both cutoff frequencies $f_{c1}$ and $f_{c2}$. As will be discussed in greater detail below, while the tone detection output produced at block 34 is primarily used to indicate that $\Delta f$ is less than $f_{c2}$, it cannot be based exclusively upon the output of differentiating tone detection block 32 because that output indicates only that $\Delta f$ is either less than $f_{c2}$ or greater than $f_{c1}$. As a result, the output of the cophase tone detection block 30 must also be monitored to discount instances in which $\Delta f$ is greater than $f_{c1}$.

As shown in FIG. 3, the tone detector output is applied to a first block 36 in the decoding logic circuit 22. At block 36, the receipt of a tone detector output is flagged and the frequency $f_r$ of the cophase reference signals R1 and R2 is reset to the frequency $f_2$ of a second tone to be detected. By repeating the foregoing process, tone detector 20 is able to detect a plurality of tones in an encoded sequence. Once tones of the proper frequency, duration, and relative timing have been detected, block 38 provides a control output to the operating system 16. As will be appreciated, because the detector 20 operates on the basis of the frequency difference between an input signal and a reference signal, rather than the absolute frequencies of such signals, its operational speed is advantageously roughly independent of frequency.

Figure 4:
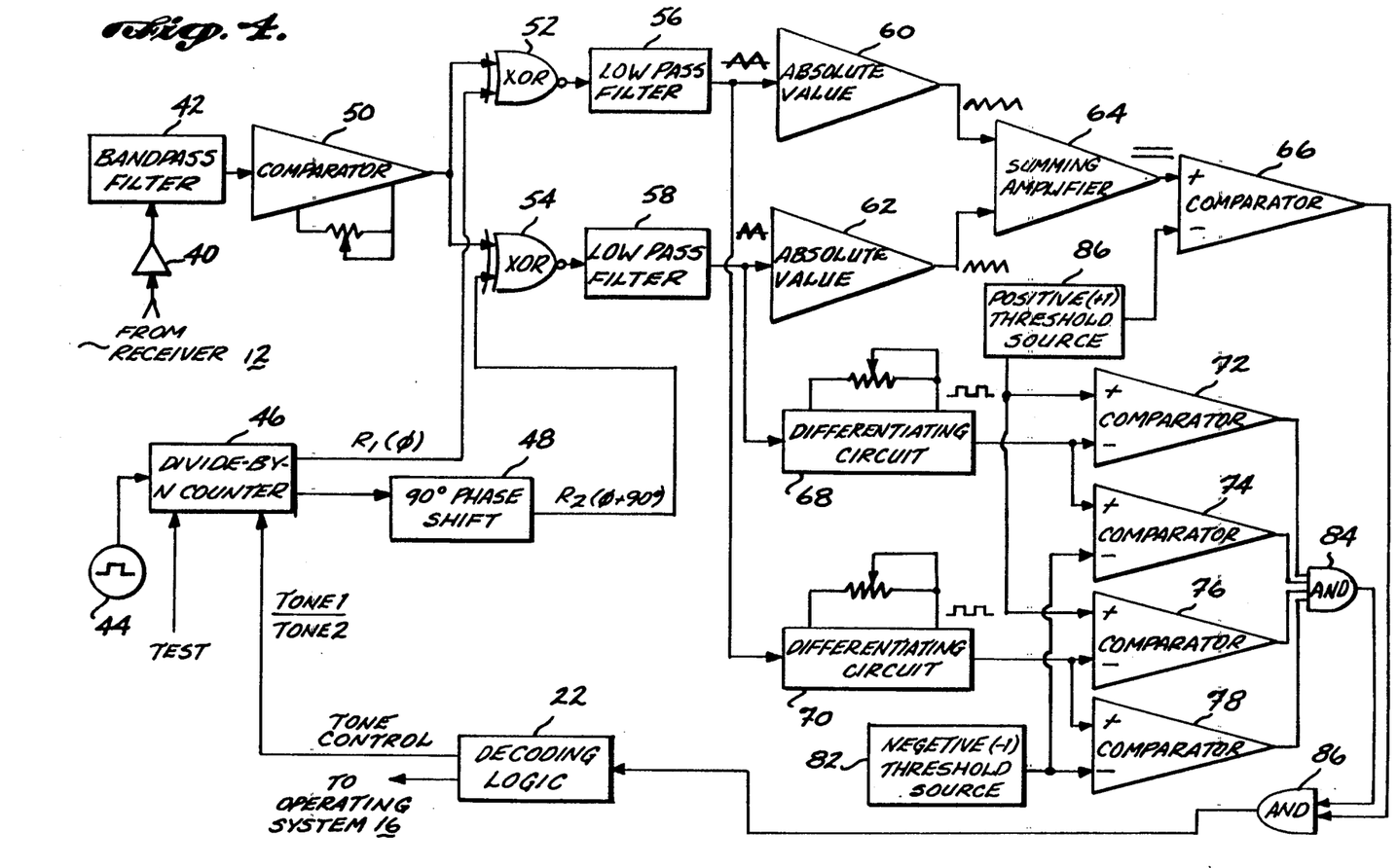
FIG. 4 is a detailed block diagram of the decoder of FIG. 2, illustrating the preferred implementation of the decoder's cophase signal and detection and differentiating signal detection function.

Addressing the operation of decoder 14 in detail, reference is now had to FIG. 4. As shown, the demodulated input tone signal provided by receiver 12 and having a frequency $f_i$ is amplified by an amplifier 40 and applied to the input of a bandpass filter 42. The passband of filter 42 extends between the frequencies $f_a$ and $f_b$, which define the expected range of all frequencies $f_1$ and $f_2$ to be sequentially encoded on the RF carrier wave and detected by decoder 14. In the logging industry application previously referred to, this range is approximately 250–6,000 Hz.

The output of bandpass filter 42 is applied to a programmable comparator 50. Comparator 50 converts the signal from bandpass filter 42 into a bidirectional square wave I by producing a logic high output when the input signal exceeds a first threshold and by producing a low logic output when the input signal falls below a second threshold. The thresholds employed by comparator 50 are programmably adjustable to ensure that the duty cycle of the square wave output is equal to 50%, regardless of the time-dependent characteristics of the signal received from bandpass filter 42. The frequency of the square wave output I, however, remains equal to the input frequency $f_i$. As will be appreciated, by producing an output I defined by two fixed logic levels, comparator 50 advantageously avoids problems that might otherwise be encountered in the remainder of detector 20 if a signal subject to variations in its peak-to-peak voltage was employed.

An oscillator 44, preferably of the crystal-stabilized type, provides an output signal having a frequency that is substantially greater than the desired detection frequencies $f_1$ and $f_2$. The output of oscillator 44 is applied to a programmable, divide-by-N counter 46, whose output frequency is equal to its input frequency divided by N. The divisor N of counter 46 is controlled by a tone control signal, described below, allowing counter 46 to produce a series of unidirectional output pulses having a predetermined frequency $f_r$ and defining a square wave reference signal R1. In the embodiment under discussion, the divisor N in counter 46 is controlled by the tone control signal so that the reference signal R1 has a frequency $f_r$ that is approximately equal to $f_1$ when the tone control signal has a high logic level and that is approximately equal to $f_2$ when the tone control signal has a low logic level.

The divide-by-N counter 46 provides the reference signal R1 both directly to the tone detector 20 and to a 90° phase shifter 48, which is preferably a two bit Gray counter. The output R2 of phase shifter 48, which is also applied to detector 20, is essentially equal to the input signal R1 shifted in either direction by a phase angle of 90°. Thus, as shown in the arrangement of FIG. 4, tone detector 20 receives cophase reference signals R1($\phi$) and R2($\phi+90°$), each having a frequency $f_r$.

As shown in FIG. 4, divide-by-N counter 46 also receives a test input from a source whose output can be selectively switched between high and low logic levels. The test input is normally set at a logic high level, allowing the counter to produce an output whose frequency is determined by the tone control signal as described above. When the test input is switched to a logic low level, however, the effect of the tone control signal is preempted and counter 46 will produce an output having a predetermined frequency $f_t$ that, for example, is equal to 1000 Hz. At that time, the various components of the detector can be calibrated on the basis of a 1000 Hz signal, whose frequency will not unexpectedly change in response to a tone control signal.

Turning now to a discussion of the combination of signals I, R1 and R2 by detector 20, reference is again had to FIG. 4. As shown, the square wave output I of comparator 50 is applied to a first input of each of two exclusive-OR logic gates 52 and 54. The second input of logic gate 52 receives the unshifted reference signal R1 from divide-by-N counter 46, while the second input of gate 54 is connected to phase shifter 48 and receives the reference signal R2. In accordance with conventional exclusive-OR logic, the logic output of either gate 52 or 54 will be low only when both inputs to the gate are either high or low. The output of either gate 52 or 54 is high when one of its inputs is high and the other is low.

Figure 5A:
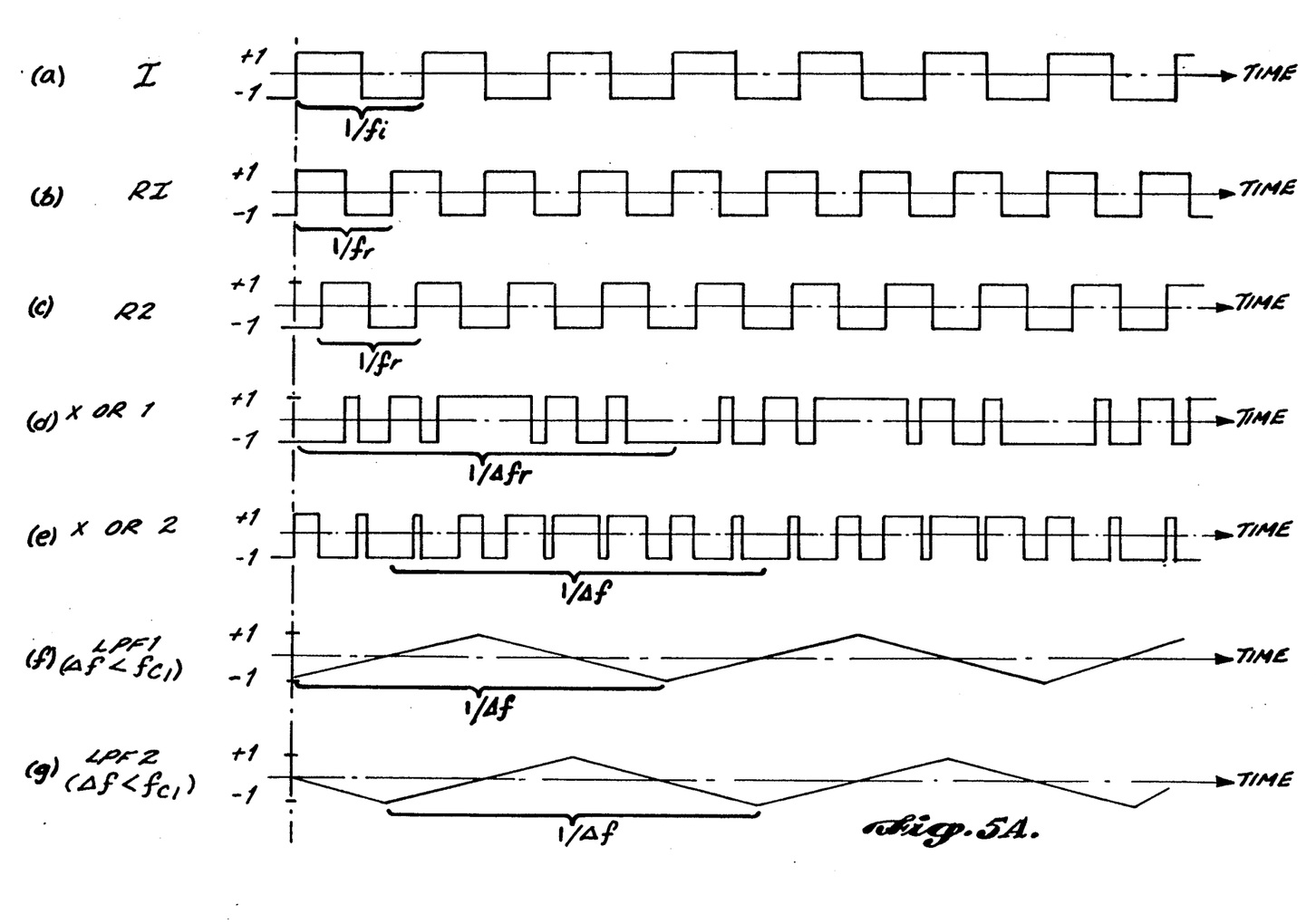
FIGS. 5A–5C are timing diagrams illustrating the operation of the decoder of FIG. 4.
Figure 5B:
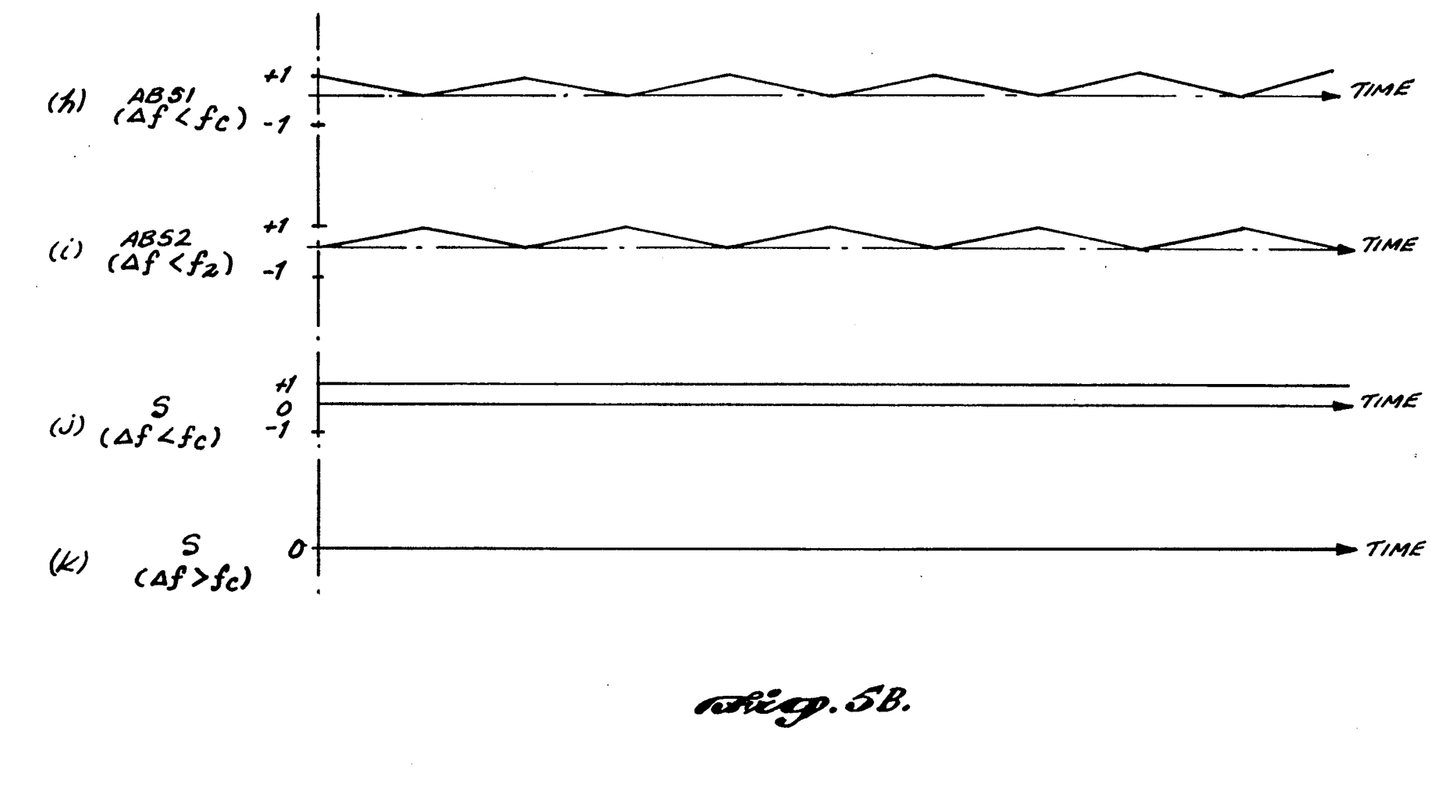
Figure 5C:
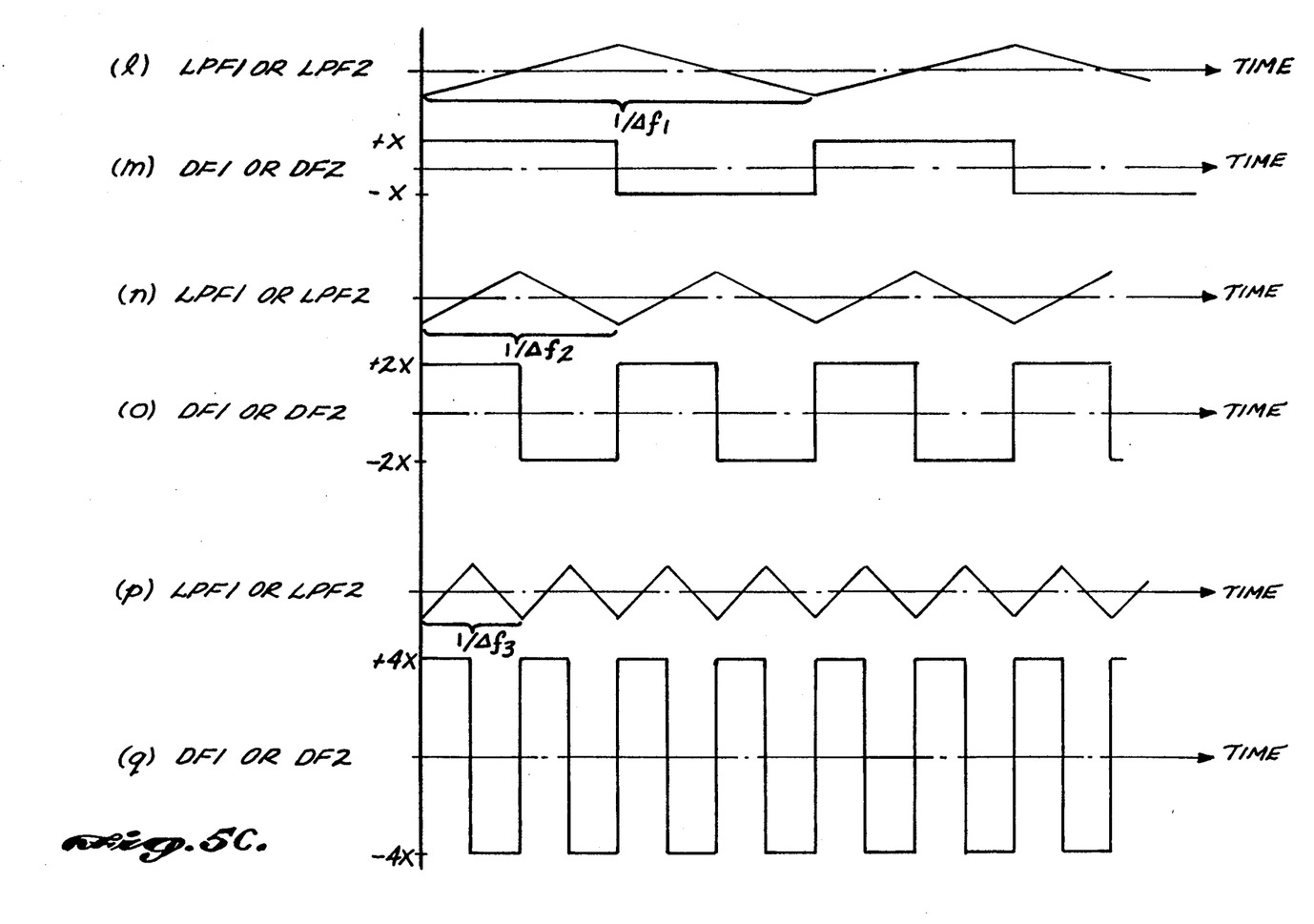

Given the exclusive-OR operation of gate 52, its output XOR1 is a stream of pulses whose widths are proportional to the phase difference between the signal I from comparator 50 and the signal R1 from divide-by-N counter 46. This relationship can be more easily appreciated with reference to the illustrative waveforms provided in FIG. 5. As shown in FIG. 5a, the square wave output I of comparator 50 has a 50% duty cycle and a frequency $f_1$. For purposes of illustration, this frequency $f_i$ is lower than the frequency $f_r$ of the reference signal R1 shown in FIG. 5b. By comparing the signals I and R1, it will be appreciated that their exclusive-OR combination at gate 52 produces the output XOR1 shown in FIG. 5d. This FIGURE clearly indicates that the duration of an individual pulse in the output XOR1 is proportional to the corresponding phase difference between signals I and R1, while the repetition frequency of the pattern of pulses defining XOR1 is equal to $\Delta f$ or the absolute value of the difference between frequencies $f_i$ and $f_r$.

Like XOR1, the output XOR2 of gate 54 is defined by a stream of pulses whose characteristics are determined by the inputs to the gate. For the illustrative signals I and R2 shown in FIGS. 5a and 5c, the exclusive-OR operation of gate 54 results in the production of the output XOR2 shown in FIG. 5e. From FIG. 5e, it will be appreciated that the width of an individual pulse in the output XOR2 is proportional to the corresponding phase difference between signals I and R2, while the repetition frequency of the pattern of pulses is equal to $\Delta f$.

The outputs XOR1 and XOR2 of gates 52 and 54 are applied to low pass filters 56 and 58. Each low pass filter 56 and 58 has a passband that extends between 0 Hz and some cutoff frequency $f_{c1}$, causing the filter to reject signals whose frequency is greater than $f_{c1}$. Because the frequency $\Delta f$ of the signals XOR1 and XOR2 corresponds to the difference between the frequency of the demodulated receiver signal and the target tone frequency $f_1$, outputs will only be produced by filters 56 and 58 if the receiver signal differs from the target tone by less than the cutoff frequency $f_{c1}$ of filters 56 and 58. Thus, the passing of a signal by either filter 56 or 58 can be used as an indication that a signal, roughly corresponding to the target tone, has been received.

As will be appreciated, by lowering the cutoff frequency $f_{c1}$ of filters 56 and 58, the frequency of the received signal must be closer to that of the target tone if an output is to be produced by filters 56 and 58. As a result, the precision of the tone detection is improved. By narrowing the passband of filters 56 and 58, however, the delay time t delay through each filter increases in accordance with the relationship:

$$t_{delay} \geq 2.3/2\pi f_{c1} \quad (2)$$

In the logging industry application discussed above, if a two-tone sequentially coded signal is to be decoded within an acceptable amount of time, the bandwidth of filters 56 and 58 is preferably no smaller than 100 Hz.

As will be appreciated, assuming that $\Delta f$ is less than $f_{c1}$, the application of signals XOR1 and XOR2 to filters 56 and 58, respectively, will result in the production of triangular wave outputs by filters 56 and 58. As shown in the illustrative waveform of FIG. 5f, the output LPF1 of filter 56 is a bidirectional triangular wave having a frequency $\Delta f$ that corresponds to the repetition frequency of the pattern of pulses defining the filter's input XOR1. Similarly, the output LPF2 of filter 58 is a bidirectional triangular wave having a frequency $\Delta f$ that corresponds to the repetition frequency of the pattern of pulses defining the filter's input XOR2. As will be appreciated from a comparison of the illustrative waveforms of FIGS. 5f and 5g, the triangular wave outputs LPF1 and LPF2 of filters 56 and 58 remain 90° out-of-phase.

Addressing now the manner in which a cophase tone detection output is produced to indicate that a signal has passed filters 56 and 58 and, hence, that the frequency of the demodulated receiver signal falls within $\pm f_{c1}$ Hz of the target frequency $f_1$, reference is again had to FIG. 4. As shown, tone detector 20 includes absolute value amplifiers 60 and 62, summing amplifier 64 and a comparator 66 that cooperate to produce a cophase tone detection output. Reviewing the operation of these components individually, the triangular wave output LPF1 of filter 56 is applied to absolute value amplifier 60, which produces a triangular wave output ABS1 that is equal to the absolute value of its input. Similarly, the triangular wave output LPF2 of filter 58 is applied to amplifier 62, resulting in the production of a triangular wave output ABS2 equal to the absolute value of its input.

As will be appreciated from the cophase nature of this system and the illustrative waveforms ABS1 and ABS2 provided in FIGS. 5h and 5i, if the output ABS1 of amplifier 60 is designated $|f(\phi)|$, the output ABS2 of amplifier 62 can be correspondingly termed $|f(\phi+90)|$. By applying these two signals to the summing amplifier 64, amplifier 64 solves the trigonometric identity of equation (1), producing a high logic level when signals are passed by low pass filters 56 and 58. More particularly, as will be appreciated from the illustrative waveforms ABS1 and ABS2 provided in FIGS. 5h and 5i, the sum of ABS1 and ABS2 equals "one" for any time t. As a result, the output S of amplifier 64 is a logic one for each such time t, as shown in FIG. 5j. Alternatively, when the frequency $\Delta f$ of the signals applied to filters 56 and 58 is outside the selected passband, the output of amplifier 64 is equal to zero or a low logic level as shown in FIG. 5k. Thus, the output S indicates whether the frequency difference $\Delta f$ between the input signal I and the reference signal R is less than $f_{c1}$ Hz from the target frequency $f_1 = f_r$.

Because the magnitude of the high output produced by amplifier 64 is a function of the level of the signals produced by filters 56 and 58 as well as the gain of amplifiers 60, 62, and 64, a comparator 66 is included to provide a cophase tone detection output having logic levels that are independent of these factors. More particularly, the output S of amplifier 64 is applied to the noninverting input of comparator 66, while the inverting input receives an appropriate positive threshold voltage from source 86. As a result, the output of comparator 66 will correspond to that of amplifier 64 but will provide a high logic output that is not affected by variations in filter signal level and amplifier gain.

As will be appreciated from the preceding discussion, to enhance the accuracy of detection without introducing an undue delay, a differentiating tone detection arrangement is provided. As shown in FIG. 4, the bidirectional, triangular wave outputs LPF1 and LPF2 of filters 56 and 58 are applied to separate adjustable differentiating circuits 68 and 70. Given the linear, positive and negative slopes exhibited by the triangular wave signals LPF1 and LPF2, the differentiating circuits 68 and 70 produce bidirectional square wave outputs DF1 and DF2, whose amplitudes are proportional to the slope of the triangular waves. Because the slope of each triangular wave LPF1 and LPF2 is proportional to its frequency, the amplitude of the bidirectional square wave outputs DF1 and DF2 of differentiating circuits 68 and 70 is directly proportional to the frequency of the corresponding signal LPF1 or LPF2 produced by low pass filters 56 and 58.

The relationship between the frequency $\Delta f$ of signals LPF1 and LPF2 and the amplitude of signals DF1 and DF2 may be more easily understood with reference to the illustrative waveforms provided in FIGS. 5l through 5q. More particularly, in FIG. 5l a waveform is shown representing, for example, the signal LPF1 having a frequency $\Delta f_1$. The waveform of FIG. 5m represents the corresponding output DF1 that would be produced by differentiating circuit 68.

As will be appreciated, the DF1 waveform simply represents the derivative of the LPF1 waveform as a function of time. Thus, because the first 180° of the LPF1 waveform shown in FIG. 5l exhibit a positive linear slope, the corresponding section of the DF1 waveform shown in FIG. 5m is at some positive uniform level x. The next half-cycle of the LPF1 waveform has a negative linear slope, resulting in a corresponding interval of negative uniform output $-x$ on the DF1 waveform. The relationship between the LPF1 and DF1 waveforms then repeats every 360°.

Now, assume that the maximum amplitude of the LPF1 waveform remains constant but its frequency is doubled to $\Delta f_2 = 2\Delta f_1$, as shown in the waveform of FIG. 5n. By doubling the frequency of LPF1, the absolute value of the slope over alternative half cycles is also doubled. As a result, the differentiating circuit output DF1, shown in FIG. 5o, alternates between uniform levels 2x and $-2x$. Similarly, with the frequency of the LPF1 waveform quadrupled to $\Delta f_3 = 4\Delta f_1$, as shown in FIG. 5p, the DF1 waveform of FIG. 5q will alternate between uniform levels 4x and $-4x$.

As will be appreciated from a comparison of FIGS. 5l through 5q, the output of either differentiating circuit 68 or 70 varies in direct proportion to the frequency of the signal LPF1 and LPF2 received from filters 56 and 58. Thus, the outputs of differentiating circuits 68 and 70 can be compared to some threshold voltage to determine whether the frequency $\Delta f$ of signals LPF1 and LPF2 exceeds some predetermined cutoff frequency $f_{c2}$. Because $\Delta f$ represents the amount by which the frequency $f_i$ of the received signal I differs from the frequency $f_r$ of the reference or target frequency to be detected, if $\Delta f$ does not exceed some sufficiently low cutoff frequency $f_{c2}$, an output indicating the detection of the desired tone may be produced.

Addressing this operation in slightly greater detail, the differentiating circuits 68 and 70 shown in FIG. 4 are adjustable to provide a predetermined output amplitude for a given input slope or frequency. For example, in the logging industry application referred to above, differentiating circuits 68 and 70 are preferably adjusted to provide a square wave output signal having a voltage swing between one and minus one volts for a triangular wave input frequency of 5 Hz. Thus, if the receiver signal frequency $f_i$ varies from the target or reference signal frequency $f_r$ by more than 5 Hz, the output of the differentiating circuits 68 and 70 will exceed a voltage range extending between plus one and minus one volt. Alternatively, if the receiver frequency $f_i$ differs from the reference frequency $f_r$ by less than 5 Hz, the signal produced by differentiating circuits 68 and 70 will fall within the plus-to-minus one volt range and a differentiating tone detection output is to be produced.

This tone detection output is produced in the following manner. As shown in FIG. 4, the output of differentiating circuit 68 is connected to the inverting input of a first comparator 72 and the noninverting input of a second comparator 74. The output of differentiating circuit 70 is similarly connected to the inverting input of a third comparator 76 and the noninverting input of a fourth comparator 78. A one volt positive threshold voltage is applied to the noninverting inputs of comparators 72 and 76 by source 80, while a one volt negative threshold voltage is applied to the inverting inputs of comparators 74 and 78 from source 82.

As will be appreciated from FIG. 4, when the variation between the receiver frequency $f_i$ and the reference frequency $f_r$ is less than 5 Hz, the output of differentiating circuits 68 and 70 will not exceed the plus or minus one volt thresholds established by sources 80 and 82. As a result, the comparators 72 and 74 will respond to the signal from circuit 68 by producing a high logic level output. Similarly, because the output of differentiating circuit 70 will fall between the voltages applied to their noninverting inputs, comparators 76 and 78 will produce a high logic level output. With the outputs of comparators 72, 74, 76 and 78 coupled by an AND gate 84, as shown in FIG. 4, a single differentiating tone detection output is produced indicating that the frequency $\Delta f$ is less than $f_{c2}$.

As will be appreciated, if the frequency $f_i$ of the receiver signal I differs from the reference frequency $f_r$ by less than 100 Hz, but more than 5 Hz, low pass filters 56 and 58 will still produce triangular wave outputs LPF1 and LPF2. Because the frequency $\Delta f$ of these outputs exceeds the 5 Hz level of $f_{c2}$ set by the adjustable differentiating circuits 68 and 70, however, the output of differentiating circuits 68 and 70 will alternate between magnitudes in excess of the plus or minus one volt thresholds. As a result, at least one of the comparators 72, 74, 76, or 78 will at any time produce a low logic level output and the resulting output of AND gate 84 will remain low.

As shown in FIG. 4, the outputs of the cophase tone detection circuits and differentiating tone detection circuits are coupled at an AND gate 86. AND gate 86 will produce a tone detect output only if both of its inputs are at a high logic level. As will be appreciated, under the circumstances set forth above, the receipt of a high differentiating tone detection output ensures that the receiver frequency $f_i$ varies from the reference frequency $f_r$ by less than $f_{c2}$ or 5 Hz. A high output from the cophase tone detection circuit is still required, however, to ensure that the receiver frequency $f_i$ does not vary from the reference frequency $f_r$ by more than $f_{c1}$ or 100 Hz. More particularly, if a 200 Hz ($>f_{c1}$) variation were to occur between the receiver and reference frequencies $f_i$ and $f_r$, a zero signal level would be output by low pass filters 56 and 58. Without the inclusion of the cophase tone detection arrangement, such a signal could be misinterpreted by the differentiating tone detection circuit as an indication that the receiver frequency is within that circuit's 5 Hz detection range.

Figure 6:
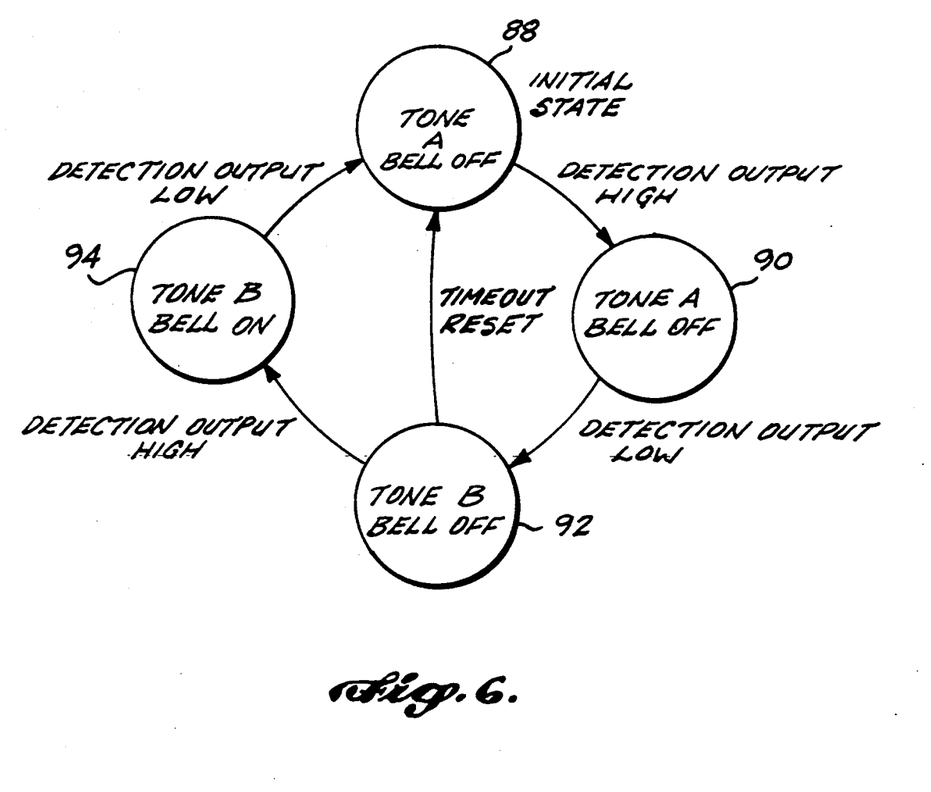
FIG. 6 is a state diagram illustrating the operation of a decoding logic circuit that responds to the output of the decoder to effect actuation of the operating system.

Addressing now the manner in which the tone detection output is employed, reference is had to FIGS. 4 and 6. As shown in FIG. 4, the output of AND gate 86 and, hence, tone detector 20 is applied to the decoding logic circuit 22. In its initial state 88 depicted in FIG. 6, tone decoding logic circuit 22 produces a tone control signal that is normally at a high logic level signifying that the tone signal to be detected is at or near the frequency $f_1$. With the high tone control signal applied to divide-by-N counter 46, the frequency $f_r$ of the reference signal R is set approximately equal to $f_1$. As a result, decoder 14 operates to detect a tone A signal at or near the frequency $f_1$ in the manner described above. In state 88, the decoding logic circuit 22 does not provide an actuating output to operating system or bell 16.

Upon the receipt of a tone A detection output from AND gate 86, the decoding logic advances to a second state 90. In state 90, the detector 20 continues to respond to the tone A signal and no change in the tone control signal or the output to operating system 16 occurs.

The decoding logic remains in state 90 until the tone A signal is no longer received by detector 20 and the output of AND gate 86 goes low. At this time, the operation of decoding circuit 22 advances to state 92 and the tone control signal switches to a low logic level. This change in the tone control signal alters the divisor N in counter 46 to result in the production of a reference signal R having a frequency $f_r$ that is approximately equal to $f_2$. In this manner, detector 20 is enabled to detect a tone B signal at or near the frequency $f_2$ and the logic circuit 22 waits for another high output from AND gate 86. As in states 88 and 90, no activating output is provided to bell 16.

The decoding logic circuit 22 operates in state 92 until one of two events occurs. First, if AND gate 86 does not produce a second logic high output within a predetermined period of time, established by the tone decoding logic circuit 22, the tone control signal returns to a high logic level and operation is returned to state 88 for the detection of a tone A signal having a frequency at or near the frequency $f_1$.

If, on the other hand, a second output signal is produced by AND gate within the requisite period of time, the tone decoding logic circuit 22 will advance to state 94 where an actuating output signal that is coupled through an output buffer to the operating system 16 will be produced. This output signal is maintained for the duration of the second output signal from AND gate 86. In the logging industry application, the predetermined period of time in which a tone signal at or near the frequency $f_2$ must be detected is approximately 60 milliseconds.

As will be appreciated, while the operation of decoding logic circuit 22 in the manner described above is preferred, alternative arrangements could be employed such as that disclosed in U.S. Pat. No. 4,197,525, "Tone Decoder," Biery, Jr. et al., issued Apr. 8, 1980, to the assignee of the present invention, which disclosure is incorporated herein by reference.

Those skilled in the art will recognize that the embodiments of the invention disclosed herein are exemplary in nature and that various changes can be made therein without departing from the scope and the spirit of the invention. In this regard, and as was previously mentioned, the invention is readily applicable to the detection of single tones or a plurality of tones encoded in various desired sequences. In addition, the detection of tones in the manner described above could be accomplished with an appropriately programmed microcomputer. Further, while the frequency range of the encoded information is within the audio spectrum in the preferred arrangement, the invention can be used to decode frequency information over substantially different portions of the electromagnetic spectrum. In addition, while the cophase and differentiating detection techniques described above rely upon the production of triangular waveforms having linear phase differences, other waveforms satisfying alternative unity identity equations could be employed. Because of the above and numerous other variations and modifications that will occur to those skilled in the art, the following claims should not be limited to the embodiments illustrated and discussed herein.

The embodiments of the invention in which an exclusive property or privilege is claimed are defined as follows:

1. A method of detecting whether the frequency $f_i$ of an input signal is within some frequency range defined with respect to the frequency $f_r$ of a reference signal, said method comprising the steps of:

producing a difference signal having a frequency $\Delta f$ equal to the difference between frequencies $f_i$ and $f_r$;

employing information about said difference signal at more than one phase angle to determine whether the frequency $\Delta f$ is less than some first value $f_{c1}$;

employing information about the slope of said difference signal to determine whether the frequency $\Delta f$ is less than some second value $f_{c2}$; and providing a detection output when the frequency difference $\Delta f$ is less than $f_{c1}$ and less than $f_{c2}$.

2. The method of claim 1, wherein the step of producing a difference signal having a frequency $\Delta f$ further comprises the steps of:

producing a first signal $f(\phi)$ whose magnitude is a function of its phase angle $\phi$ and whose frequency is equal to $\Delta f$; and producing a second signal $f(\beta)$ whose magnitude is a function of its phase angle $\beta$ and whose frequency is equal to $\Delta f$, $f(\beta)$ being offset from $f(\phi)$ by 90°, the sum S of the absolute value of $f(\phi)$ and the absolute value of $f(\beta)$ being equal to one when $\Delta f$ is less than $f_{c1}$.

3. The method of claim 2, wherein the step of employing information about the difference signal at more than one phase angle further comprises the step of monitoring the sum S and providing a cophase detection output when S is equal to one.

4. The method of claim 3, wherein the slope of at least one of the first and second signals is proportional to the frequency difference $\Delta f$ and wherein the step of employing information about the slope of the difference signal further comprises the steps of:

differentiating the signal whose slope is proportional to the frequency difference $\Delta f$ to provide a slope detection signal proportional to the frequency difference $\Delta f$; and providing a differentiating detection output when the slope detection signal is less than $f_{c2}$.

5. The method of claim 4, wherein the step of producing the first signal $f(\phi)$ comprises the step of producing a first square wave signal having a frequency $\Delta f$ and wherein the step of producing the second signal $f(\beta)$ comprises the step of producing a second square wave signal having a frequency $\Delta f$, and a phase angle offset from the phase angle of the first square wave by 90°.

6. The method of claim 5, wherein the step of producing the first signal $f(\phi)$ further comprises the step of low pass filtering the first square wave signal to provide a first triangular wave signal when $\Delta f$ is less than $f_{c1}$ and wherein the step of producing the second signal $f(\beta)$ further comprises the step of low pass filtering the second square wave signal to provide a second triangular wave signal when $\Delta f$ is less than $f_{c1}$.

7. The method of claim 6, wherein the step of monitoring the sum S comprises adding the absolute values of the first and second triangular wave signals.

8. The method of claim 7, wherein $f_{c1}$ is equal to 100 Hz and $f_{c2}$ is equal to 5 Hz.

9. A tone detector for detecting whether the frequency $f_i$ of an input signal is within some frequency range defined with respect to the frequency $f_r$ of a reference signal, the tone detector comprising:

signal conditioning means for producing a first signal $f(\phi)$ whose magnitude is a function of its phase angle $\phi$ and a second signal $f(\beta)$ whose magnitude is a function of its phase angle $\beta$, the frequency of the first and second signals being equal to a frequency $\Delta f$ equal to the difference between frequencies $f_i$ and $f_r$, $f(\beta)$ being offset from $f(\phi)$ by 90°;

cophase detection means for combining the first and second signals to produce the sum S of the absolute value of $f(\phi)$ and the absolute value of $f(\beta)$, the sum S being equal to one when the frequency difference $\Delta f$ is less than some first value $f_{c1}$; and output means for monitoring the sum S and providing a cophase detection output when the frequency difference $\Delta f$ is less than $f_{c1}$ and S is equal to one.

10. A method of detecting whether the frequency $f_i$ of an input signal is within some frequency range defined with respect to the frequency $f_r$ of a reference signal, said method comprising the steps of:

producing a difference signal having a frequency $\Delta f$ equal to the difference between frequencies $f_i$ and $f_r$ by:

(i) producing a first signal $f(\phi)$ whose magnitude is a function of its phase angle $\phi$ and whose frequency is equal to $\Delta f$; and (ii) producing a second signal $f(\beta)$ whose magnitude is a function of its phase angle $\beta$ and whose frequency is equal to $\Delta f$, $f(\beta)$ being offset from $f(\phi)$ by 90°, the sum S of the absolute value of $f(\phi)$ and the absolute value of $f(\beta)$ being equal to one when $\Delta f$ is less than some level $f_{c1}$;

combining information about said difference signal at more than one phase angle to determine whether the frequency $\Delta f$ is less than some first value $f_{c1}$; and providing a cophase detection output when the frequency difference $\Delta f$ is less than $f_{c1}$.

11. The method of claim 10, wherein the step of combining information about the difference signal at more than one phase angle further comprises the step of monitoring the sum S and providing a cophase detection output when S is equal to one.

12. The method of claim 11, wherein the step of producing the first signal $f(\phi)$ comprises the step of producing a first square wave signal having a frequency $\Delta f$ and wherein the step of producing the second signal $f(\beta)$ comprises the step of producing a second square wave signal having a frequency $\Delta f$, and a phase angle offset from the phase angle of the first square wave by 90°.

13. The method of claim 12, wherein the step of producing the first signal $f(\phi)$ further comprises the step of low pass filtering the first square wave signal to provide a first triangular wave signal when $\Delta f$ is less than $f_{c1}$ and wherein the step of producing the second signal $f(\beta)$ further comprises the step of low pass filtering the second square wave signal to provide a second triangular wave signal when $\Delta f$ is less than $f_{c1}$.

14. The method of claim 13, wherein the step of monitoring the sum S comprises adding the absolute values of the first and second triangular wave signals.

15. The method of claim 14, wherein $f_{c1}$ is equal to 100 Hz.

16. A method of detecting whether the frequency $f_i$ of an input signal is within some frequency range defined with respect to the frequency $f_r$ of a reference signal, said method comprising the steps of:

producing a first signal whose slope is proportional to $\Delta f$, where $\Delta f$ is equal to the difference between frequencies $f_i$ and $f_r$;

differentiating the first signal to provide a slope detection signal proportional to the frequency difference $\Delta f$; and providing a differentiating detection output when the slope detection signal is less than some defined level $f_{c2}$.

17. The method of claim 16, wherein the step of producing the first signal whose slope is proportional to the frequency difference $\Delta f$ comprises the step of producing a triangular wave signal.

18. The method of claim 17, wherein $f_{c2}$ equals 5 Hz.

19. A method of detecting whether the frequency $f_i$ of an input signal is within some frequency range defined with respect to the frequency $f_r$ of a reference signal, said method comprising the steps of:

monitoring a frequency difference $\Delta f$ that is equal to the difference between the frequencies $f_i$ and $f_r$;

producing a first output when said frequency difference $\Delta f$ is less than some value $f_{c1}$;

producing a second output when said frequency difference $\Delta f$ is either less than some value $f_{c2}$ or greater than some value $f_{c1}$; and producing a detection output when both said first and second outputs are produced, said detection output indicating that said frequency difference $\Delta f$ is less than $f_{c2}$.

20. A tone detector for detecting whether the frequency $f_i$ of an input signal is within some frequency range defined with respect to the frequency $f_r$ of a reference signal, the tone detector comprising:

means for producing a first signal whose slope is proportional to the difference $\Delta f$ between frequencies $f_i$ and $f_r$;

differentiating means for differentiating the first signal to provide a slope detection signal proportional to the frequency difference $\Delta f$; and differentiating detection output means for providing a differentiating detection output when the slope detection signal is less than some level $f_{c2}$.

21. A decoding apparatus for detecting whether the frequency $f_i$ of an input signal is within a passband surrounding a desired detection frequency $f_r$, said decoding apparatus comprising:

means for providing a cophase reference signal having components R1 and R2 of frequency $f_r$ and being offset in phase by 90°;

means for mixing the input signal with said reference signal R1 to provide a first output signal and for mixing the input signal with said reference signal R2 to provide a second output signal, said first and second output signals having a frequency $\Delta f$ that is equal to the difference between frequencies $f_i$ and $f_r$ and a phase relationship that is offset by 90°;

low pass filter means for filtering said first and second output signals to produce first and second low pass filtered signals when $\Delta f$ is less than some predetermined frequency $f_{c1}$;

cophase detection output means for receiving said first and second low pass filtered outputs and producing a cophase detection output when $\Delta f$ is less than $f_{c1}$;

differentiating tone detection means for receiving said low pass filtered outputs and providing a differentiating detection output when the slope of one of said low pass filtered signals corresponds to a low pass filtered signal frequency less than some second level $f_{c2}$; and, tone detection output means for receiving said cophase and differentiating tone detection outputs and producing a tone detection output when $\Delta f$ is less than both $f_{c1}$ and $f_{c2}$.

22. The decoding apparatus of claim 21, wherein $f_{c1} = 100$ Hz and $f_{c2} = 5$ Hz.

* * * * *